Sept. 29, 1931.  H. NAVRATIEL  1,825,011
METALLURGICAL FURNACE
Filed Dec. 27, 1928
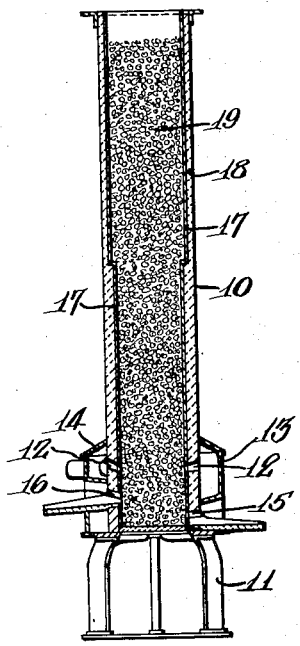
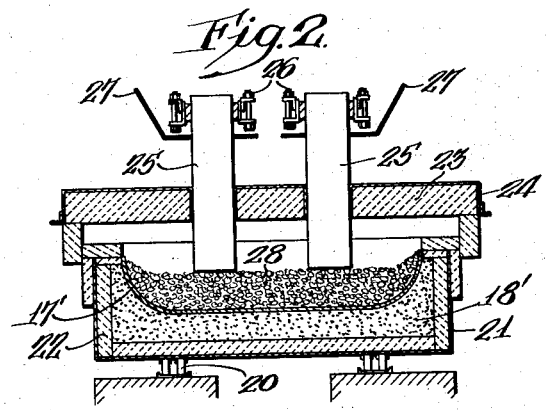
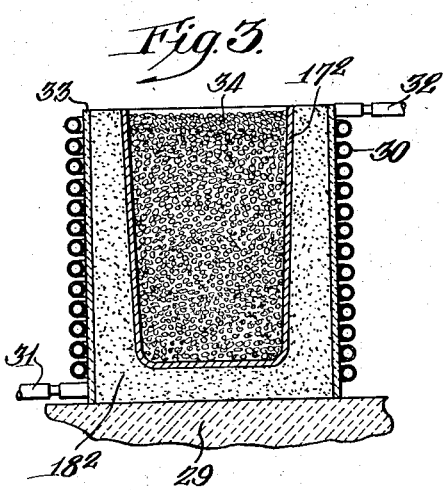
Inventor
Hans Navratiel
Witnesses:
Elmer W. Hacker
Walter Chism
by
Attorney Patented Sept. 29, 1931

1,825,011

UNITED STATES PATENT OFFICE

HANS NAVRATIEL, OF FLINT, MICHIGAN, ASSIGNOR TO VACUUMSCHMELZE G. M. B. H., OF FRANKFORT-ON-THE-MAIN, GERMANY, A CORPORATION OF GERMANY

METALLURGICAL FURNACE

Application filed December 27, 1928, Serial No. 328,858, and in Germany January 2, 1928.

My invention relates to a process for the production and repair of refractory linings for the hearths of metallurgical and other furnaces and is an improvement in or modification of the process described and claimed in the pending specification filed by Wilhelm Rohn Ser. No. 755,480. In the said specification there is described a process for the production and repair of refractory linings for hearths of metallurgical and other furnaces. This process is working by means of a mould or template, consisting of a body of the shape of the hearth, which is allowed to remain in the hearth and is subsequently melted, and the process consists in filling behind and around the sides of the mould or template a dry granular refractory material, without the addition of any moistening agent or any medium, adapted to render the mass particularly workable, which refractory material is adapted to sinter or frit in a direction from the charge outwards and thus to assume and retain its final form prior to the mould or template melting.

For example in the case of an induction furnace, the process described in said specification is carried out by introducing the first charge into the sheet metal body serving as template, and heating the furnace up to a temperature just below the incipient melting point of the charge. This temperature is kept constant for some time. According to the degree of the temperature, the refractory lining begins to frit or sinter together. In the case of charges which have very low melting temperatures, certain refractory substances, such as quartz sand, require an addition of sinterable substances, in a finely divided state, such as powdered glass or boric acid, which serve as sintering agent.

The selection of the refractory material for the furnace hearth depends primarily on the material which is to be melted. The refractory material must not react with the constituents of the melt and it must also remain of constant volume at the working temperatures employed, that is to say, it must neither shrink or expand. A third particularly important property is stability under sudden changes of temperature, to which the material of the furnace is exposed, especially in re-charging and rapid heating up.

On account of its chemical character, quartz sand is a raw material frequently employed for the hearths of furnaces intended for melting copper, brass, nickel, constantan, nickelin and other metals and alloys. Quartz sand, however, also possesses certain physical properties which adversely affect its use as a hearth lining. Thus, its sintering point is so high as to necessitate the addition of sintering agents when it is used, in nickel-, copper- and other melting furnaces, for metals of low melting temperatures. Moreover, at 575° C., quartz undergoes a polymorphous transformation, which is accompanied by a change of about 1% in volume. In heating, this change of volume occurs in the form of an increase, and, in cooling, as a decrease, this change recurring every time the quartz passes through the temperature of 575° C. These changes in volume, which occur rapidly under sudden changes of temperature, set up stresses in the mass of quartz which relieve themselves by the formation of cracks and fissures.

Another undesirable property of quartz is that of "growing" at higher temperatures. The growth is due to the transformation of quartz into cristobalite, at temperatures practically above 1400° C., and amounts to about 14%. In the case of quartz sand, this growth proceeds very gradually, so that masses rich in quartz, do not become stabilized in volume until after protracted use. The growth cleaves the individual quartz crystals, thereby rendering the texture of the mass loose and fragile.

Like quartz at 575° C., cristobalite undergoes, at 230° C., a polymorphous transformation which is accompanied by a change of about 2%. This change in volume renders masses containing cristobalite, particularly sensitive to rapid changes of temperature between 200 and 300° C.

My invention is directed to realize the application of silicia without having recourse to any additional chemicals and to avoid the disadvantages above described in the use of quartz. By this procedure for the first time the melting of metals in an exclusive silica-made hearth of dry granular refractory material is made possible.

My invention consists in lining hearths of metallurgical and other furnaces of the making described above with quartzite of the cemented quartzite type, that is to say, a type of mineral in which small grains of quartz are cemented together by siliceous binding material in contrast to the typical or rock quartzites. Such cement-quartzites contain about one-third of siliceous material in an extremely fine state of division, and the native impurities, such as $Fe_2O_3$, $Al_2O_3$ and the like are finely distributed in the quartzite. In comparison with the varieties of quartz, quartz sand and the rock quartzites, the cement quartzites possess the great technical advantage that they become completely transformed, by a single heating to about 1450° C., that is to say, they attain their maximum growth, whereas, in the case of the aforesaid minerals, this maximum has not been reached after heatings at 1450° C. Owing to the presence of the impurities, the cement quartzites undergo, on heating to 1450° C., an extensive sintering due to the fusing of compounds formed in the interim, which sintering renders the burned cement quartzite sufficiently firm for use as a lining for melting copper, nickel, brass, constantan, nickelin and the like. The presence of the extremely finely divided fluxing agent also facilitates the formation of tridymite in the quartzite, that is to say, that modification of silica which is truly stable between 900 and 1500° C. On this account, tridymite is of constant volume within this range of temperature and is, of all modifications of silica, the most resistant towards the action of molten metals and slags. Masses in which tridymite predominates are insensitive to sudden changes of temperatures, in all ranges, since the polymorphous transformation of tridymite at 110–115° C. is accompanied by only a very slight change in volume.

Although, as stated in the specification of Rohn Ser. No. 755,480 quartz sand also can be fritted at about 1450° C. on addition of powdered glass and boric acid, the employment of quartz sand is always attended with the inconvenienec that such fritting is merely superficial, because the fritting agent cannot be reduced, by artificial means, to the same degree of fineness as that of the impurities in cement quartzite. Moreover, for the aforesaid reasons, the lining which contains quartz does not attain constancy of volume until after protracted heating, and, insofar as cristobalite is chiefly present, remains sensitive to temperatures between 200 and 300° C., whilst quartz which is still untransformed renders the mass sensitive to temperature at 575° C.

In the drawings similar numerals refer to like parts.

Figure 1 is a vertical central section of a cupola furnace to which my invention may be applied.

Figure 2 is a vertical central section of an electric arc furnace which embodies my invention.

Figure 3 is a vertical central section of a coreless induction furnace embodying my invention.

The cupola furnace of Figure 1 comprises an outer metallic shell 10 supported upon a base 11 and having tuyères 12 supplied with blast from housings 13 and 14. A tap hole for the metal is shown at 15 and one for the slag at 16.

Within the outer shell 10 a metallic form 17 has been placed and refractory material 18 of cementitious quartzite has been packed between the casing 10 and the form 17.

My invention relates particularly to the use of cementitious quartzite as the refractory 18. The refractory will preferably be inserted free from moisture or other temporary binding medium, and also free from slagging additions.

Coke is shown at 19 for heating the furnace. In operation the temperature maintained in the furnace is slightly below that necessary to melt the metallic form 17. In this way heat will be conducted through the form 17 to the refractory 18 and the refractory will be sintered in place. Heating is continued long enough to complete the cristobalite transformation and sinter the mass. When the refractory has been sintered to a sufficient extent the temperature in the furnace is suitably increased to melt out the form 17.

Figure 2 illustrates a conventional electric arc furnace supported at 20, and comprising an external metallic casing 21, heat insulation 22, and roof 23, provided with a metallic cover 24. Electrodes 25 are inserted through the roof. The electrodes are supported by clamps 26 and are supplied with current through leads 27.

Inside the heat insulation 22 I place a cementitious quartzite lining 18', the shape of whose upper surface is maintained by a metallic shell 17'. In operation the furnace is charged with any suitable material 28 and current passed between the electrodes to heat up the charge and, through the form 17', to heat the lining 18'. The temperature is such as to maintain the form 17' slightly below its melting point while heat is being conducted to the lining 18' to sinter it.

The conventional electric induction furnace as shown in Figure 3 consists of a base 29, an inductor coil 30, formed of hollow water cooled tubing, supplied with water through connections 31 and 32 and a structural casing 33 of any suitable material, desirably fused quartz. Within the casing 33 I have placed a metallic form $17^2$, and I have packed cementitious quartzite $18^2$ between the form and the outer casing. Inside the form I have placed a suitable charge 34.

The furnace is operated to maintain temperature in the metallic form $17^2$ during sintering below that necessary to melt the form. After the lining $18^2$ is sufficiently sintered, the temperature may be increased so as to melt out the form $17^2$.

I claim:

1. A metallurgical furnace comprising an outer wall, an inner metal template having a melting point below the intended temperature of the charge and a dry, finely divided granular refractory material adapted to sinter at a temperature below the melting temperature of the template, filling the space between the wall and the template and comprising small grains of cementitious quartzite initially cemented together by cementitious binding material as distinguished from the typical or rock quartzite.

2. In a metallurgical furnace, an outer wall, an inner metal template lying within and spaced from the outer wall and having a melting point below the intended temperature of the charge and a dry, finely divided granular quartzite between the outer wall and template in sintering engagement with the template and containing cementitious impurity adapted to reduce the sintering point of the quartzite.

In testimony whereof I have hereunto set my hand.

HANS NAVRATIEL.